United States Patent
Tsai et al.

(10) Patent No.: US 6,807,627 B2
(45) Date of Patent: Oct. 19, 2004

(54) PRESERVING THE CONTENT OF A FIRST REGISTER WITHOUT AFFECTING THE CONTENT OF A SECOND REGISTER

(75) Inventors: Jenn-Yuan Tsai, Cupertino, CA (US); Vinodha Ramasamy, Campbell, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 605 days.

(21) Appl. No.: 09/765,930

(22) Filed: Jan. 19, 2001

(65) Prior Publication Data

US 2002/0099931 A1 Jul. 25, 2002

(51) Int. Cl.[7] ............................................. G06F 9/312
(52) U.S. Cl. ......................................................... 712/228
(58) Field of Search ................................. 712/220, 228

(56) References Cited

U.S. PATENT DOCUMENTS 5,021,993 A * 6/1991 Matoba et al. .............. 712/228
5,812,823 A * 9/1998 Kahle et al. .................. 703/26
6,128,728 A * 10/2000 Dowling ...................... 712/228

OTHER PUBLICATIONS

Intel IA–64 Architecture Software Developer's Maunal, Jul. 2000, vol. 2 p. 15–2, vol. 3 p. 2–147.*

* cited by examiner

Primary Examiner—Eddie Chan
Assistant Examiner—Barry J. O'Brien
(74) Attorney, Agent, or Firm—Tuan V. Ngo

(57) ABSTRACT

Techniques are disclosed for preserving first content in a first register. In one embodiment, the first register is a general register, a second register is a UNaT register, and each general register is associated with a NaT bit. To preserve the content of the UNaT register while saving the content of a general register and its associated NaT bit, the content of the general register is saved to a floating-point register, and the NaT bit associated with the general register is also saved. If the NaT bit is set, then only the NaT bit is restored. Conversely, if the NaT bit is not set, then both the content of the general register and the NaT bit are restored.

18 Claims, 2 Drawing Sheets

PRESERVING THE CONTENT OF A FIRST REGISTER WITHOUT AFFECTING THE CONTENT OF A SECOND REGISTER

FIELD OF THE INVENTION

The present invention relates generally to using registers in various situations such as program modification or code instrumentation. More specifically, the invention relates to preserving the content of a first register so that this register may be used without affecting the content of a second register.

BACKGROUND OF THE INVENTION

Program modification is often implemented in code instrumentation, which is a process for analyzing programming code, usually executables. During this process, new instructions (or probe code) are added to the program, and, consequently, the original code in the program is changed and/or relocated, resulting in modified or instrumented code. Some examples of added instructions include adding values to a register, moving the content of one register to another register, moving the address of some data to some registers, etc. Code instrumentation may be done both statically and dynamically (i.e., while the program is running). In one approach, probe code is binary or assembly code.

Registers refer to special, high-speed areas storing data to be processed by the program code. A free register is a register that can be used in code instrumentation without violating program correctness. Compiler annotations and data flow analysis may provide information to identify free registers. However, compiler annotations require specific support from the compiler while data flow analysis is expensive. Alternatively, modifying the output parameters of a program statement provides a method for allocating registers. However, in one embodiment, this approach cannot be used to obtain free registers if the original code already uses all registers that can be made available using this approach. In an alternative approach, before the registers are used in the probe code, the content of the registers is saved to memory, and, after the registers are used in the probe code, the content of the registers is restored from memory. Unfortunately, in various situations, saving the content of a register to memory may cause the system to change the content of other registers, which changes the program semantics. For example, in the IA64 system architecture of Hewlett-Packard Company of Palo Alto, Calif., saving/restoring the content of a general register on the memory stack, while also preserving the NaT bit associated with the general register, causes the system to save the NaT bit into the UNaT register. This changes the content of the UNaT register as seen by the original program code, which may result in changed program behavior.

Based on the foregoing, it is clearly desirable that mechanisms be provided to solve the above deficiencies and associated problems.

SUMMARY OF THE INVENTION

The present invention, in various embodiments, provides techniques for preserving first content in a first register while maintaining second content in a second register wherein saving the first content to a particular location changes the second content in the second register. In one embodiment, the first register is a general register, the second register is a UNaT register, and each general register is associated with a NaT bit. In one aspect, saving the content of a general register to memory causes the system to save the associated NaT bit to the UNaT register, which, in effect, changes the content of the UNaT register. To preserve the content of the UNaT register while saving the content of a general register so that the general register may be used in programming code modification, the content of the general register, in one embodiment, is saved to a floating-point register. After the general register has been used, the content of the general register saved in the floating-point register is restored to the general register.

In one embodiment, when the content of a general register is saved to the floating-point register, the NaT bit associated with the general register is also saved. Further, if the NaT bit is not "set," then the content of the general register needs to be restored, and, if the NaT bit is set, then the content of the general register may be discarded. Consequently, if the NaT bit is set, then only the NaT bit is restored. Conversely, if the NaT bit is not set, then both the content of the general register and the NaT bit are restored. Where it is desirable that the content of the floating-point register be preserved, this content is saved to memory and restored to the floating-register after the floating-point register has been used.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF VARIOUS EMBODIMENTS

The present invention, in various embodiments, provides techniques for preserving first content in a first register while maintaining second content in a second register wherein saving the first content in the first register to a particular location changes the second content in the second register. In the following description, for the purposes of explanation, numerous specific details are set forth in order to provide a thorough understanding of the invention. However, it will be apparent to one skilled in the art that the invention may be practiced without these specific details. In other instances, well-known structures and devices are shown in block diagram form in order to avoid unnecessarily obscuring the invention.

APPLICATIONS OF THE TECHNIQUES DISCLOSED HEREIN

The techniques disclosed herein may be useful, and thus explained, in the context of programming code instrumentation, which usually uses registers for modifying program code. However, the invention is not limited to code instrumentation, but is applicable to other programming areas in which using one register may affect the content of another register. In one embodiment, in the IA64 system architecture of Hewlett-Packard Company of Palo Alto, Calif., there are at least two types of registers: general registers and floating-point registers. Each general register has 64 bits of normal data storage plus an additional bit, the NaT (Not a Thing) bit, which is used to track deferred speculative exceptions. For a floating-point register, deferred speculative exceptions are recorded with a special register value called NaTVal (Not a Thing Value). The User NaT (UnaT) Collection Register is a 64-bit register used to temporarily hold NaT bits when saving and restoring general registers with the IA64 ld8.fill and st8.spill instructions. In one embodiment, when an instruction is invoked to save the content of a general register to memory, the system automatically saves the NaT bit associated with the general register to the UNaT register. This, in effect, changes the content of the UNaT register. Consequently, if the UNaT register was used in the original code, the perceived register state is different and this may lead to changed program behavior.

METHOD STEPS IN ACCORDANCE WITH ONE EMBODIMENT

Figure 1:
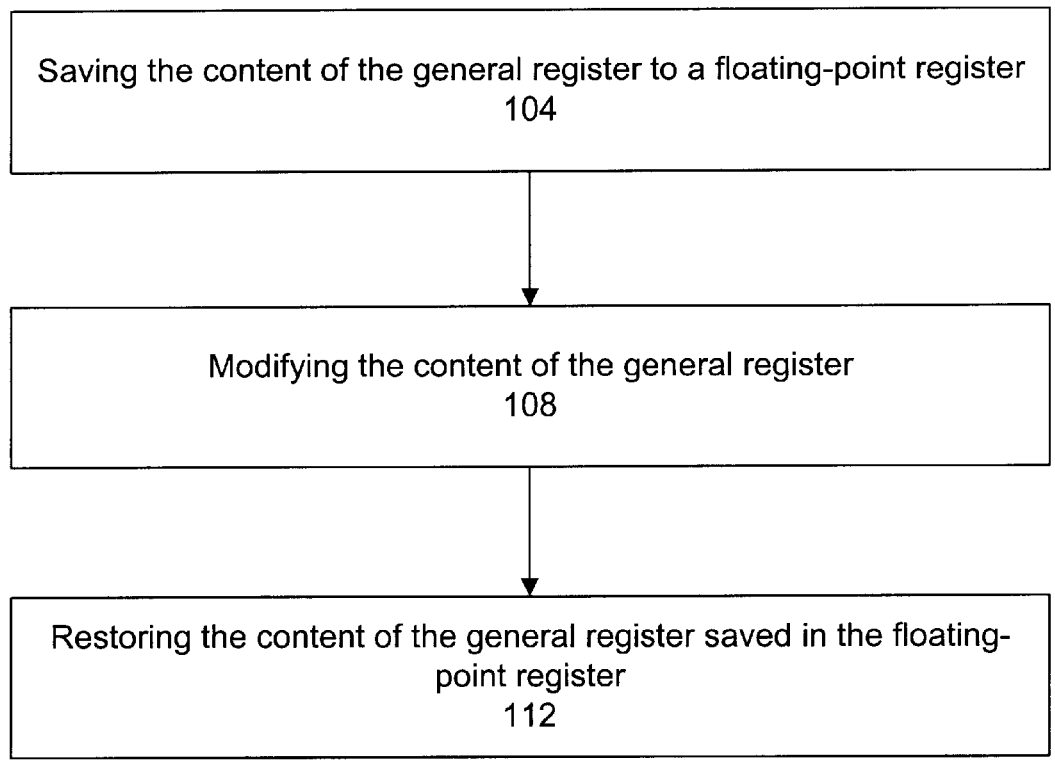
FIG. 1 is a flowchart illustrating the method steps in accordance with one embodiment.

FIG. 1 is a flow chart illustrating the method steps in accordance with one embodiment. In this FIG. 1 example, a general register is selected for use in code instrumentation. During this process, even though the content of the general register is saved so that the register may be used, the content of the UNaT register remains intact. In step 104, the content of a general register is saved in a floating-point register. In one embodiment, the NaT bit associated with the general register is also saved. In step 108, the general register is used in code instrumentation, i.e., the content in the general register is changed during this code instrumentation process. In step 112, after the general register is no longer used, the content of the general register is restored from the floating-point register.

In one embodiment, if the NaT bit is not set, then the content of the general register needs to be restored. However, if the NaT bit has been set, then the content of the general register is irrelevant and may be discarded. Consequently, if the NaT bit is set, then only the NaT bit is restored, and, if the NaT bit is not set, then both the content of the general register and the NaT bit are restored. In one embodiment, the NaT bit is encoded as a special value (NaTVa1) in the floating point register.

In various situations such as where there is not any free floating-point register, it is desirable that the content of the floating-point register be preserved before the floating-point register may be used. In these conditions, before the floating-register is used to store the content of the general register, the content of the floating-point register is saved to memory. Subsequently, after the content of the general register has been restored from the floating-point register, the content of the floating-point register is restored from memory. In one embodiment, saving the content of the floating-point register to memory does not change the content of the UNaT register.

In accordance with the techniques disclosed herein, any general register can be used for code instrumentation without regards to the content of the register because this content is first saved to a floating-point register and later restored after the general register has been used. Consequently, this saves time from finding free registers, which, in many situations, is expensive. Further, the content of the UNaT register remains intact during code instrumentation.

COMPUTER SYSTEM OVERVIEW

Figure 2:
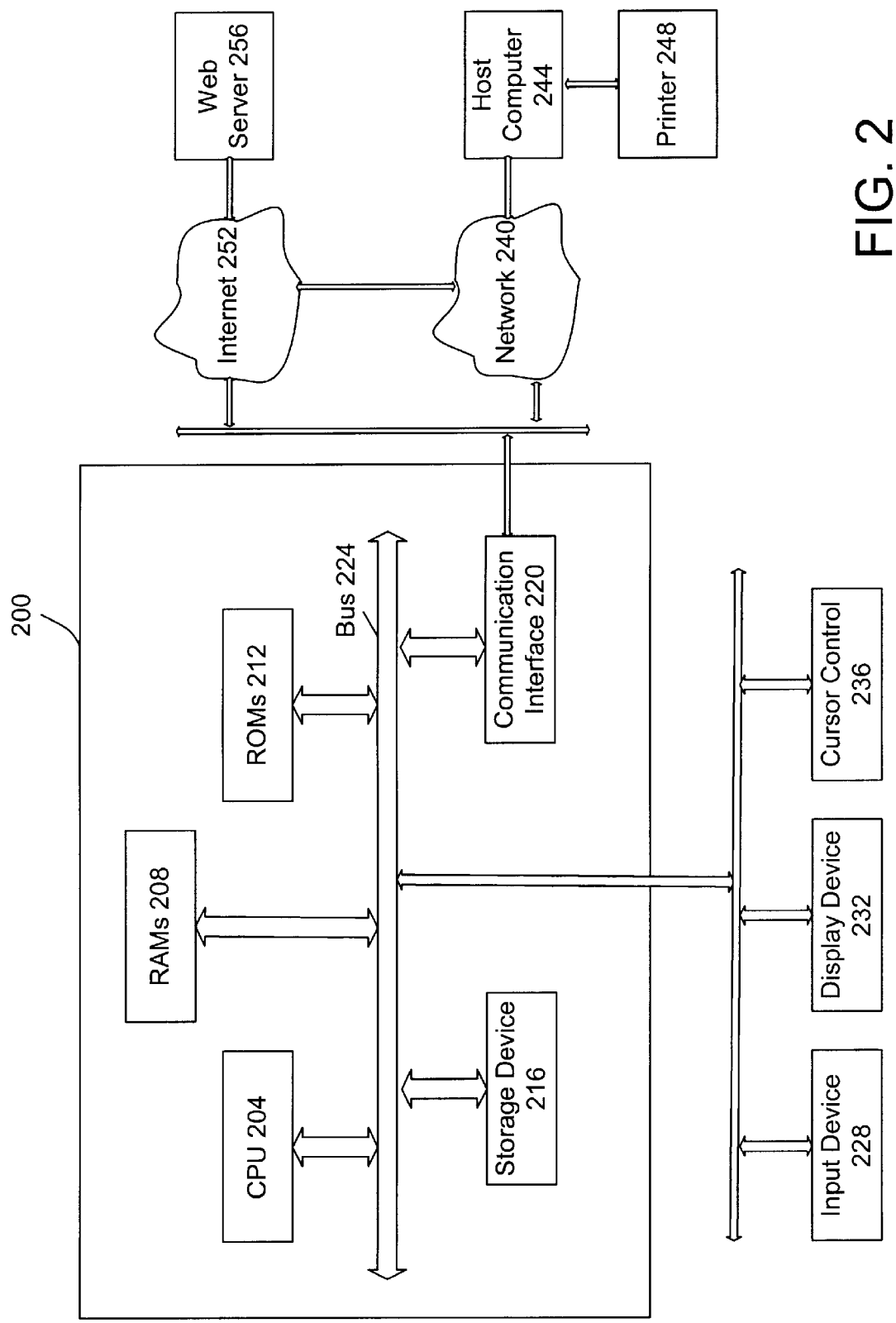
FIG. 2 show a block diagram of a computer upon which embodiments of the invention may be implemented.

FIG. 2 is a block diagram showing a computer system 200 upon which an embodiment of the invention may be implemented. For example, computer system 200 may be implemented to run the code modification or code instrumentation disclosed above. In one embodiment, computer system 200 includes a processor or CPU 204, random access memories (RAMs) 208, read-only memories (ROMs) 212, a storage device 216, and a communication interface 220, all of which are connected to a bus 224.

Processor 204 controls logic, processes information, and coordinates activities within computer system 200. In one embodiment, processor 204 executes instructions stored in RAMs 208 and ROMs 212, by, for example, coordinating the movement of data from input device 228 to display device 232.

RAMs 208, usually being referred to as main memory, temporarily store information and instructions to be executed by processor 204. Information in RAMs 208 may be obtained from input device 228 or generated by processor 204 as part of the algorithmic processes required by the instructions that are executed by processor 204.

ROMs 212 store information and instructions that, once written in a ROM chip, are read-only and are not modified or removed. In one embodiment, ROMs 212 store commands for configurations and initial operations of computer system 200.

Storage device 216, such as floppy disks, disk drives, or tape drives, durably stores information for used by computer system 200.

Communication interface 220 enables computer system 200 to interface with other computers or devices. Communication interface 220 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 220 may also allow wireless communications.

Bus 224 can be any communication mechanism for communicating information for use by computer system 200. In the example of FIG. 2, bus 224 is a media for transferring data between processor 204, RAMs 208, ROMs 212, storage device 216, communication interface 220, etc.

Computer system 200 is typically coupled to an input device 228, a display device 232, and a cursor control 236. Input device 228, such as a keyboard including alphanumeric and other keys, communicates information and commands to processor 204. Display device 232, such as a cathode ray tube (CRT), displays information to users of computer system 200. Cursor control 236, such as a mouse, a trackball, or cursor direction keys, communicates direction information and commands to processor 204 and controls cursor movement on display device 232.

Computer system 200 may communicate with other computers or devices through one or more networks. For example, computer system 200, using communication interface 220, communicates through a network 240 to another computer 244 connected to a printer 248, or through the world wide web 252 to a server 256. The world wide web 252 is commonly referred to as the "Internet." Alternatively, computer system 200 may access the Internet 252 via network 240.

Computer system 200 may be used to implement the techniques described above. In various embodiments, processor 204 performs the steps of the techniques by executing instructions brought to RAMs 208. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 204 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 204 are in the form of one or more software programs and are initially stored in a CD-ROM being interfaced with computer system 200 via bus 224. Computer system 200 loads these instructions in RAMs 208, executes some instructions, and sends some instructions via communication interface 220, a modem, and a telephone line to a network, e.g. network 240, the Internet 252, etc. A remote computer, receiving data through a network cable, executes the received instructions and sends the data to computer system 200 to be stored in storage device 216.

In the foregoing specification, the invention has been described with reference to specific embodiments thereof. However, it will be evident that various modifications and changes may be made thereto without departing from the broader spirit and scope of the invention. For example, the invention is not limited to code instrumentation or specific type of registers. Accordingly, the specification and drawings are to be regarded as illustrative rather than as restrictive.

What is claimed is:

1. A method for preserving first content in a first register while maintaining second content in a second register, the method comprising the steps of:

saving the first content to a third register;

modifying the first content in the first register; and restoring the first content saved in the third register to the first register when a value associated with the first register is in an unset state;

wherein saving the first content to a particular location other than the third register changes the second content in the second register; and saving the first content to the third register maintains the second content in the second register.

2. The method of claim 1 wherein the particular location is memory of a computer system.

3. The method of claim 1 wherein the step of saving the first content to the third register comprises the step of saving the value associated with the first register.

4. The method of claim 1 wherein the step of modifying is performed during code instrumentation of a program.

5. The method of claim 1 wherein the first register is a general register and the third register is a floating-point register.

6. A method for preserving first content in a first register while maintaining second content in a second register, the method comprising the steps of:

saving the first content and a value associated with the first register to a third register;

modifying the first content in the first register; and restoring the value associated with the first register saved in the third register to that value's original location at the time that value was saved;

wherein saving the first content to a particular location other than the third register changes the second content in the second register; and saving the first content to the third register maintains the second content in the second register.

7. The method of claim 6 wherein the step of restoring comprises the step of restoring the first content saved in the third register to the first register if the value is in an unset state.

8. The method of claim 6 wherein the value is coded.

9. The method of claim 6 wherein saving the first content in the first register to the particular location causes the value to be saved in the second register.

10. The method of claim 9 wherein the particular location is memory of a computer system.

11. The method of claim 6 further comprising the step of preserving third content in the third register before the step of saving.

12. The method of claim 11 wherein the step of preserving comprises the steps of:

before the step of saving the first content, saving the third content in the third register to memory; and after the step of restoring, restoring the third content in memory to the third register.

13. The method of claim 12 wherein the step of saving the third content in the third register to the memory does not alter the second content in the second register.

14. The method of claim 6 wherein the step of modifying is performed during code instrumentation of a program.

15. The method of claim 6 wherein the first register is a general register and the third register is a floating-point register.

16. A computer-readable medium embodying program instructions to perform a method for preserving first content in a first register while maintaining second content in a second register, the method comprising the steps of:

saving the first content to a third register;

modifying the first content in the first register; and restoring the first content saved in the third register to the first register when a value associated with the first register is in an unset state;

wherein saving the first content to a particular location other than the third register changes the second content in the second register, and saving the first content to the third register maintains the second content in the second register.

17. The computer-readable medium of claim 16 wherein the method further comprises the step of saving the value associated with the first register.

18. The computer-readable medium of claim 16 being used in code instrumentation of a program.

* * * * *